United States Patent

[11] 3,571,797

[72] Inventors William W. Hardin;
Patrick J. Traglia, Rochester, Minn.
[21] Appl. No. 829,409
[22] Filed June 2, 1969
[45] Patented Mar. 23, 1971
[73] Assignee International Business Machines Corporation
Armonk, N.Y.

[54] AREA-FORMAT CONTROL IN A CHARACTER-RECOGNITON SYSTEM
15 Claims, 5 Drawing Figs.

[52] U.S. Cl. ........ 340/146.3
[51] Int. Cl. ........ G06r 9/04
[50] Field of Search ........ 340/146.3, 173; 315/10, 18; 178/7.7

[56] References Cited
UNITED STATES PATENTS

| | | | |
|---|---|---|---|
| 3,337,766 | 8/1967 | Malaby | 340/146.3 |
| 3,408,458 | 10/1968 | Hennis | 340/146.3 |
| 3,506,807 | 4/1970 | Malaby | 340/146.3X |
| 3,506,963 | 4/1970 | Dohler et al. | 340/146.3 |

*Primary Examiner*—Thomas A. Robinson
*Attorneys*—Hanifin and Jancin and James Michael Anglin

ABSTRACT: Scan-control apparatus responsive to a format word specifying an outline of a document field to be scanned generates a series of search patterns for characters within the field. A "read" command causes a scanning beam to move in a line-search scan downwardly from one corner of the field. When black video is detected by this scan, a character-search scan moves the beam horizontally to establish the beginning of a character line. The first character found is normalized and a recognition scan is initiated. Reaching a selected format end-of-line boundary terminates the "read" command. Further "load-format" and "read" commands cause the beam to continue to search for and read character lines within the boundary. The field is terminated when the scanning beam attains a selected vertical boundary of the format word. A single field may contain a number of rectangular sections.

INVENTORS
WILLIAM W. HARDIN
PATRICK J. TRAGLIA
BY
ATTORNEY

AREA-FORMAT CONTROL IN A CHARACTER-RECOGNITON SYSTEM

BACKGROUND OF THE INVENTION

One of the major objectives of current character-recognition systems is to minimize the constraints which must be placed upon their input data. Current needs stress the requirements for flexibility in such areas as multifont recognition, accurate separation of characters from each other, wide-range size normalization, and several others.

One aspect of this objective concerns the physical arrangement of characters upon the documents to be read. Consequently, a recent trend in optical character readers involves the use of format control to achieve great flexibility in the document formats which a single reader may handle. Commonly assigned U.S. Pat. No. 3,337,766, for instance, discloses a format-control system for calibrating an optical scanner to the position of each individual document to be read. This patent also demonstrates the use of selectable scanning modes. Commonly assigned application U.S. Ser. No. 672,551, filed Oct. 3, 1967, discloses apparatus for digitizing the above operations in order to simplify the communications between the recognition system and a data processor and in order to simplify the storage of format-control information.

The above system enable a scanner to pick out areas containing relevant information without needlessly scanning the entire document. These and other prior-art format-control schemes, however, still require a great deal of a priori information concerning the layout of an input document. One major disadvantage is that the position of each line of data must be specified in a separate format word. Furthermore, each line position must be specified in relation to a preprinted reference mark on the document itself. The speed and flexibility advantages of prior format-control systems are therefore at least partially offset by the complexity and rigidity required of the format words.

SUMMARY OF THE INVENTION

Against the foregoing background, the present invention advances the state of the scan-control art by providing novel apparatus responsive to a format word which is capable of specifying a multiline field on a document to be read.

Another object of the invention is to provide apparatus for scanning nonrectangular character fields on a document.

An additional object of the invention is to provide scan-control apparatus which is inexpensive to produce and which is compatible with the input-output requirements of existing data-processor channels.

The foregoing and other objects of the invention are realized by the combination of a position-detection unit responsive to a format word from a data processor for producing representation of the position of a scanning beam with respect to field boundaries contained in the format word, a margin-control unit responsive to the position-detection unit for producing margin signals and an area-terminate signal, and a scan-selection unit responsive to the preceding two units for causing a beam control to move the scanning beam sequentially in a series of predetermined patterns. The scan-selection unit contains a seek generator for positioning the beam relative to at least one of the format-word boundaries, a line-search scan generator, a strike generator for positioning the beam relative to black video detected during the line-search scan, and a recognition scan generator responsive, either directly or indirectly, to the strike generator. The invention additionally provides a margin latch in the margin-control unit; this latch is responsive to a first set of format-word boundaries for altering the margin signals in accordance with a second set of format-word boundaries. Further features of the invention provide means for subsuming character-search, normalizing and initializing scan patterns in a variable-format scan-control apparatus.

The foregoing and additional objects and features of the present invention, as well as modifications obvious to those skilled in the applicable arts, will appear from the following detailed description of a preferred embodiment of the invention, taken in conjunction with the accompanying drawings.

Detailed Description

Figure 1:
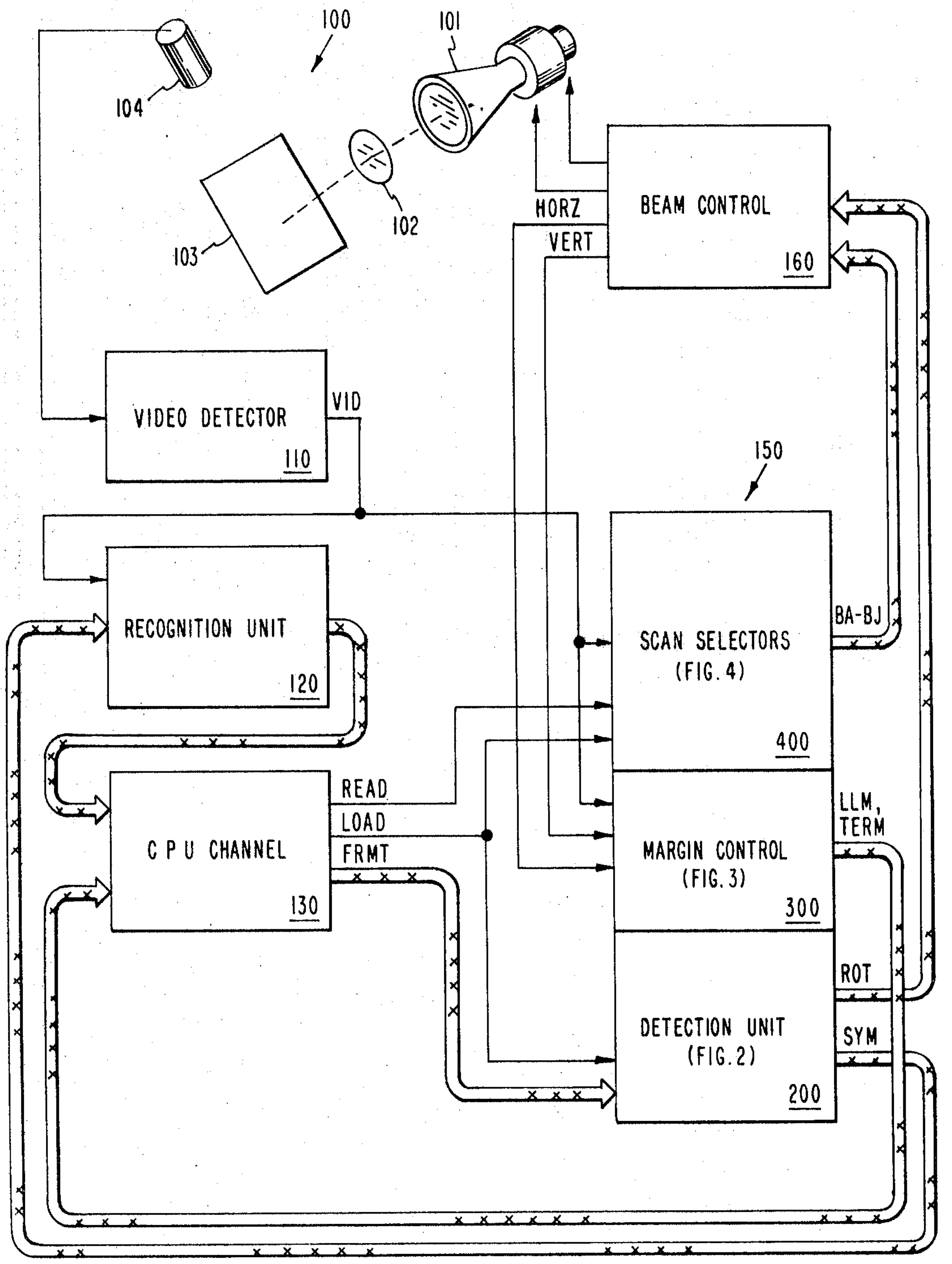
FIG. 1 is a block diagram of a scan-control apparatus according to the invention, showing connections to other parts of a character-recognition system.

Referring more particularly to FIG. 1, the reference numeral 100 denotes generally a character-recognition system in which a scanning beam generated by a cathode-ray tube (CRT) 101 is focused through a lens 102 onto a document 103. A photomultiplier tube (PMT) 104 collects diffuse reflected light from the document and converts it into an electrical signal for a video detector 110. A digitized video signal VID from detector 110 proceeds to a recognition unit 120 for analysis. Throughout the following description, the phrase "-black video" will refer to a video signal indicative of the information desired to be read, and "white video" to a signal indicative of a background; obviously, any other combination of colors or shades may be employed.

Digital codes of the recognized characters then proceed to a central processing unit (CPU) channel, or data processor, 130. The scan-control apparatus 150 of the present invention receives video signals VID from detector 110; it also receives serial "read" commands (READ), "load-format" commands (LOAD) and format words (FRMT) from channel 130. These inputs cause unit 150 to produce beam-movement signals BA-BJ for the use of a conventional beam control 160. Additional signals ROT cause control 160 to select the proper field rotation. Unit 160 then develops horizontal and vertical deflection voltages for CRT 101. Feedback signals indicative of the horizontal and vertical coordinates of the scanning beam are indicated as HORZ and VERT, respectively.

Further outputs LLM and TERM from apparatus 150 signal the existence of end conditions to the channel 130. More specifically, LLM terminates the READ command when the end of a line of characters has been reached; TERM indicates the end of a particular field on the document.

For convenience of description, the scan-control apparatus 150 is divided into three units 200, 300 and 400. Bearing in mind the description of the overall system diagram of FIG. 1 and the preceding outline of the operation of the invention, the individual units 200—400 will now be described in greater detail.

THE POSITION-DETECTION UNIT

Figure 2:
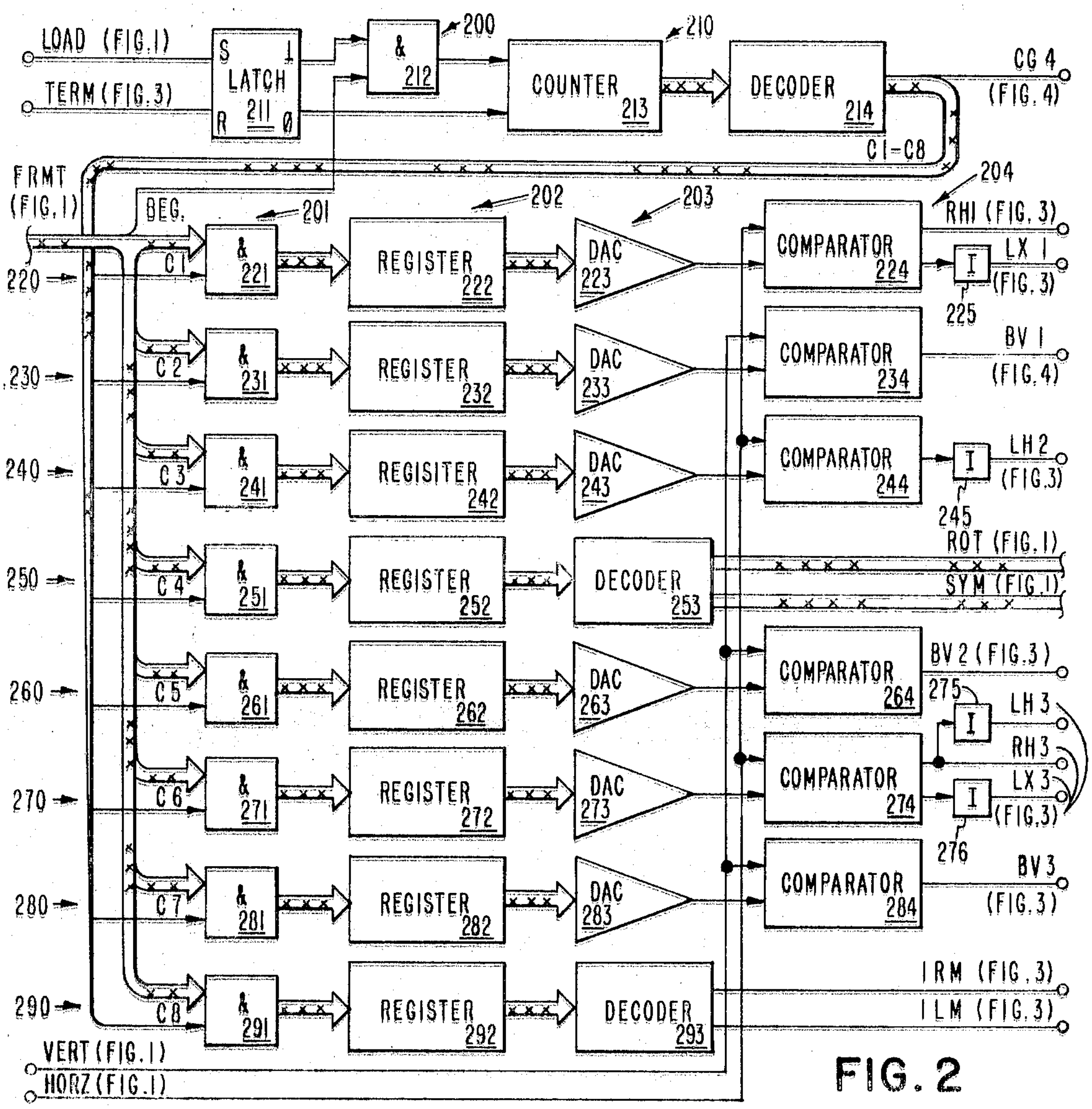
FIG. 2 is a diagram of the position-detection unit of FIG. 1.

The purpose of detection unit 200, FIG. 2, is to translate a digital format word from CPU channel 130 into a number of analogue and digital signals indicative of the boundaries and the types of fields to be read, and to compare the position of the scanning beam to the format-word boundaries. The operation of unit 200 begins when a LOAD command activates a sequencer 210 by setting latch 211 and enabling AND gate 212. The format word FRMT is transmitted to unit 200 in parallel by bit and serially by bytes; a signal BEG accompanying each byte causes AND 212 to increment counter 213. Decoder 214 then provides an output on one of the lines C1—C8 to indicate the number stored in counter 213. Another signal, CG4, indicates that the number stored in counter 213 is greater than 4; since a conventional format word for specifying a single character line contains only four bytes, the signal CG4 indicates that a multiline field is to be scanned. Banks of AND gates 201 receive count signals C1—C8 and the format word to enter each byte of the word into a separate one of the bank 202 of registers. That is, the subunits 201 and 202 change the format word to an entirely parallel representation. A subunit 203 then converts the outputs of registers 202 into analogue and decoded digital forms. A comparison subunit 204 measures the analogue signals against the CRT deflection voltages VERT and HORZ to develop digital indications of the position of the scanning beam with respect to the various format-word boundaries.

A preferred form of the format word contains eight bytes for specifying six field boundaries and two kinds of field types. A subunit 200 gates and stores the first format-word byte, and converts it to an analogue voltage indicative of a first horizontal field boundary. Comparator 224 then produces an output signal RH1 when the scanning beam is located to the right of the first horizontal boundary. Comparator 224, and inverter 225, also produce a signal LX1 when the scanning beam is to the left of a first auxiliary boundary located one inch (or any other convenient distance) to the left of the first horizontal boundary. Subunit 230 processes the second format-word byte to produce a signal BV1 indicating that the beam is below a first vertical boundary. The representation stored in register 242 of subunit 240 is a second horizontal boundary; comparator 244 and inverter 245 produce a signal LH2 when the beam is to the left of this boundary. The representation in register 252 signifies that the field to be read is one of a number of predetermined types. One output SYM of decoder 253, for instance, specifies a particular symbol set to be utilized by recognition unit 120. Another output ROT specifies the rotation of the character lines with respect to the travel direction of the document 103. Since this latter output merely causes beam-control apparatus 160 to interchange its horizontal and vertical output signals, the word "horizontal" when used in connection with the scan-control apparatus 150, must be taken in a more general sense as meaning a direction parallel to character lines to be read. Correspondingly, the word "vertical" must be taken to signify a direction transverse to the character lines.

A second group of field-specification subunits 260—290 structurally duplicate the foregoing first group 220—250. In this second group, register 262 stores the fifth byte of the format word, which represents a second vertical boundary of the document field. This representation is converted to an analogue voltage in digital-to analogue converter (DAC) 263 and compared to the CRT voltage VERT in comparator 264 to produce a signal BV2 indicating that the scanning beam is located below the second vertical boundary. Similarily, register 272 of subunit 270 stores a representation of a third horizontal boundary. This digital boundary signal is processed by DAC 273, comparator 274 and inverters 275, 276 to produce three output signals: LH3 indicates that the scanning beam is to the left of the third horizontal boundary; RH3 indicates that the beam is to the right of the third horizontal boundary; LX3 indicates that the beam is to the left of an auxiliary boundary located one inch (or any other convenient distance) to the left of the third horizontal boundary. Subunit 280 generates a signal BV3 when the scanning beam is below a third horizontal boundary, specified in byte 7 of the format word. Register 292 contains a second group of field-type information. This information is converted to useable form by decoder 293. The only outputs of decoder 293 which are germane to the present scan-control apparatus are the margin-status signals ILM and IRM, which indicate respectively that the left or the right margins of the field are to be indented, as will be explained hereinbelow.

As has been stated, the output CG4 of sequencer 210 is utilized by scan-selection unit 400. The outputs ROT and SYM of decoder 253 are utilized by the beam control 160 and the recognition unit 120, respectively. The output BV1 of comparator 234 is also employed by scan-selection unit 400. The various outputs of subunits 220, 240 and 260—290 proceed to margin-control unit 300.

THE MARGIN-CONTROL UNIT

Figure 3:
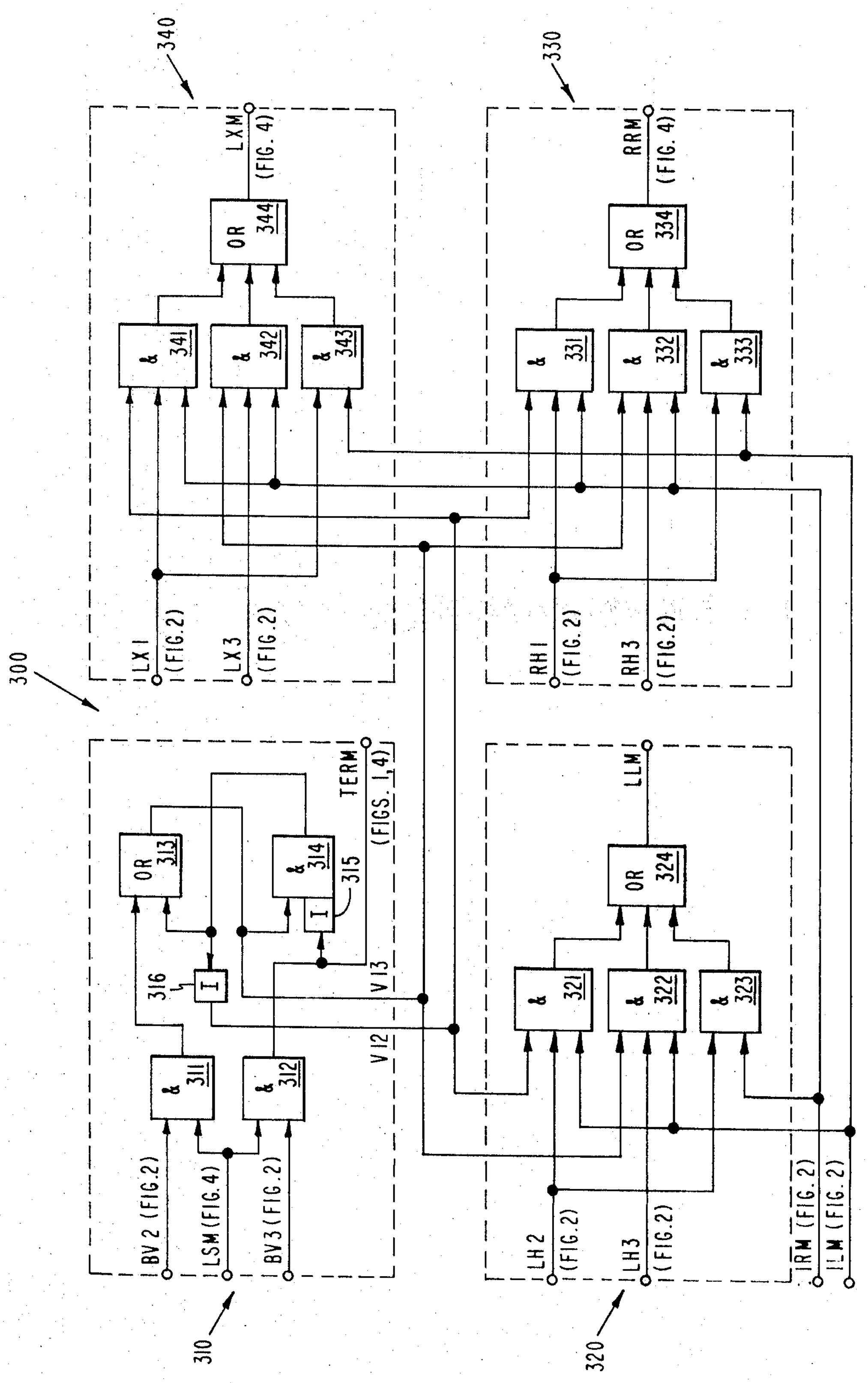
FIG. 3 shows the margin-control unit of FIG. 1.

The purpose of margin-control unit 300, FIG. 3, is to combine the above-mentioned signals from position-detection unit 200 into other signals which indicate the position of the scanning beam relative to selected ones of the outlines or boundaries of a document area specified by the format word FRMT. More specifically, a margin latch 310 of unit 300 produces a field-termination signal TERM and a pair of subarea signals V12 and V23 which respectively indicate that the scanning beam lies between the first and second vertical boundaries or between the second and third vertical boundaries. Left and right margin switches 320 and 330 indicate respectively that the scanning beam is left of the left margin of the document area or right of its right margin. An auxiliary margin switch 340 signals that the scanning beam has crossed an auxiliary margin, whose purpose will be explained hereinafter. The operation of unit 300 may be better understood by following its description in connection with several different types of document fields 510—540 portrayed in FIG. 5. The boundary designations used correspond to the convention adopted in connection with FIG. 2. Additionally, the name of an AND gate from FIG. 3 appears in parentheses beside each portion of a horizontal field boundary; this gate is the one which signals the crossing of its associated boundary by the scanning beam.

Figure 5:
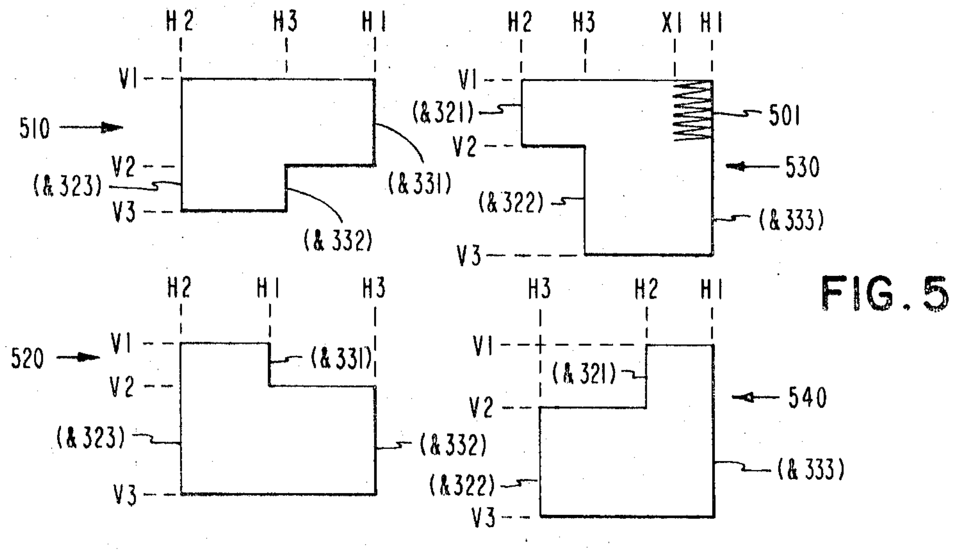
FIG. 5 is a diagram of several types of document fields which may be specified by the scan-control apparatus of FIGS. 1—4.

Returning to FIG. 3, the margin latch 310 indicates whether the scanning beam is in the upper portion or the lower portion of any of the fields shown in FIG. 5. When the scanning beam crosses the second vertical boundary while the scan-selection unit 400 is in its line-search mode, signals BV2 and LSM activate AND 311. OR 313 then provides the above-mentioned V23 signal. Then, since the beam is above the third vertical boundary, AND 312 is not activated, and the outputs of OR 313 and inverter 315 energize AND 314. This provides the second input to Or 313 to maintain it in its "on" state, and also inhibits the V12 signal through inverter 316. Subsequently, when the scanning beam crosses the third vertical boundary (BV3) while searching for lines, AND 312 is activated, thereby inhibiting the output of AND 314 and energizing the line carrying signal V12. Although both of the signals V12 and V23 are up at this time, no adverse effect occurs; this is true since AND 312 also provides a signal TERM which causes the scan-control apparatus to terminate the entire field. Then, when a new field begins, only the signal V12 will remain activated.

Margin switch 320 determines the point at which the scanning beam crosses the current left-hand boundary of the document field. When the signal IRM indicates that the right margin of the field is to be indented, the left margin is constant throughout the field. Consequently, AND 323 provides the "left of left margin" (LLM) signal through OR 324 when the "left of second horizontal boundary" (LH2) signal is activated. On the other hand, when the left margin is to be indented (ILM), the position of the left margin will depend upon whether the scanning beam is in the upper (V12) or the lower (V23) portion of the field. Accordingly, AND 321 specifies that the beam is left of the left margin when it is to the left of the second horizontal boundary (LH2). When the beam is in the lower portion of the field, AND 322 energizes the LLM signal when the beam is to the left of the third horizontal boundary (LH3). Thus, the left-hand boundary of the field may be either the second or the third horizontal boundary, depending upon the signals IRM, ILM, V12 and V23.

Margin switch 330 operates in a similar manner. For an ILM signal, RH1 produces the RRM signal through AND 333 and OR 334. When the right margin is to be indented, IRM causes the RRM signal to be produced from either RH1 or RH3, depending upon the signals V12 and V23, through ANDs 331 and 332 respectively.

The auxiliary-margin switch 340 duplicates the structure of switch 330. Its boundary inputs, however, are LX1 and LX3.

The function of the resultant LXM signal is to provide an artificial lefthand field boundary for purposes of the line-search scan, to be described in connection with FIG. 4. Its function is for convenience only; the auxiliary boundary is not strictly necessary to define the actual document field.

THE SCAN-SELECTION UNIT

Figure 4:
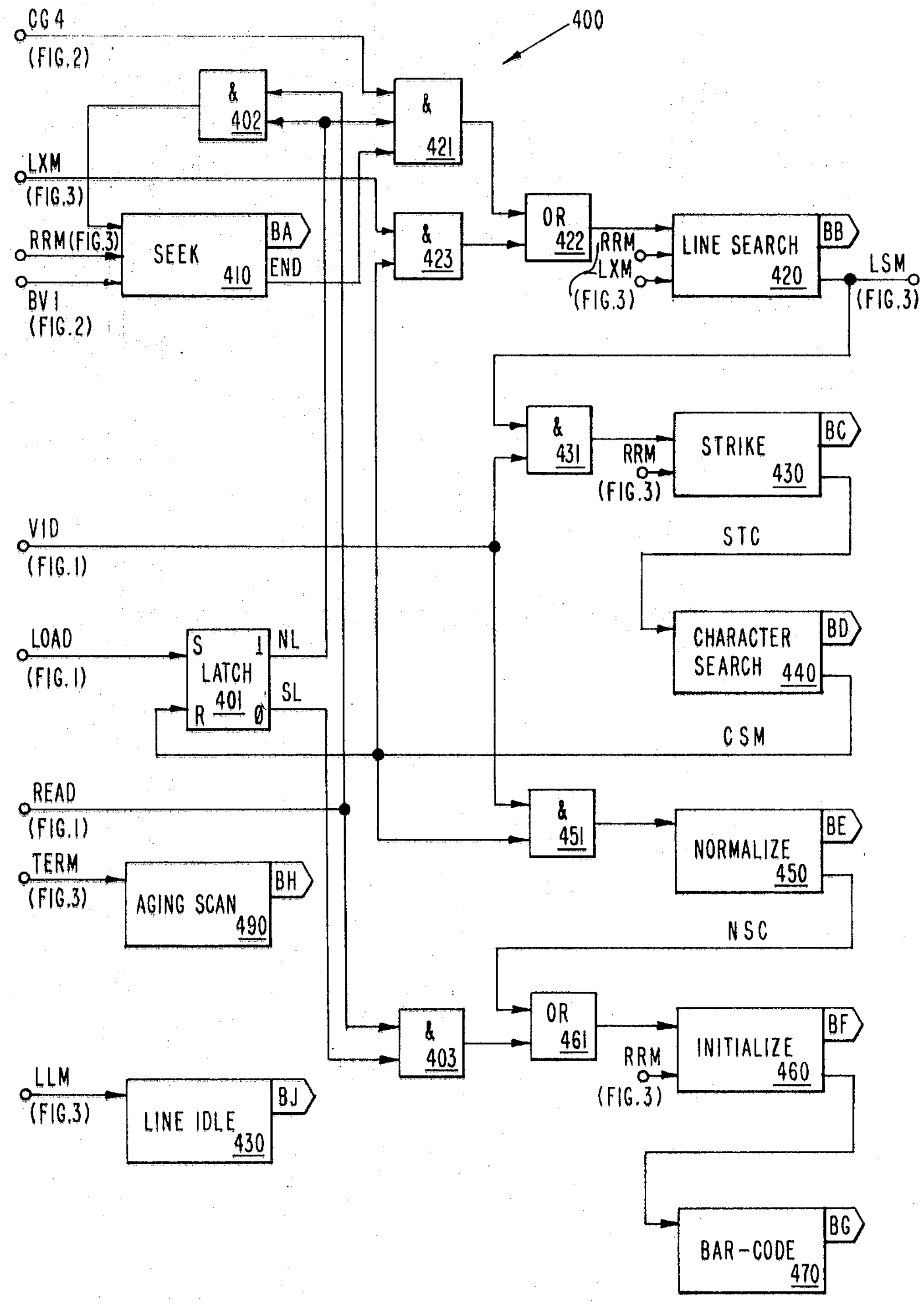
FIG. 4 illustrates the scan-selection unit of FIG. 1.

The scan-selection unit 400, FIG. 4, contains a number of scan generators and associated logic circuits for generating a sequence of scans across the face of a document to be read. The order of the scans in the sequence is controlled by the logic shown in FIG. 4 and by the inputs VID, LOAD and READ. The document areas over which these scans occur, however, are determined by various outputs from the units 200 and 300, which derive ultimately from the format word from CPU channel 130, and from the results of previous scan sequences selected by the unit 400.

An initial scanning sequence begins when channel 130 issues a LOAD command to set a next-line latch 401. A subsequent READ command from channel 130 then energizes seek generator 410 through AND 402. This generator produces an output BA to move the scanning beam in a conventional manner to the intersection of the right margin (RRM) and the first vertical boundary (BV1) of the particular area to be searched. An END signal is produced when the beam has reached the proper position.

At the end of the seek operation, the next-line signal NL, the END signal and the area-scan enabling signal CG4 activate a line-search generator 420 through gates 421 and 422. Generator 420 produces conventional scan-control signals BB to cause the scanning beam to move back and forth between the right margin (RRM) and the auxiliary boundary (LXM) at a rapid rate, and downwardly at a slower rate. This scan is indicated by the numeral 501, FIG. 5. Another output signal LSM indicates that the scan-selection unit 400 is in a line-search mode.

When the line-search scan hits black video (VID), a strike generator 430 is energized by AND 431. This generator produces an output on line BC to increment the scanning beam downwardly by a predetermined distance (e.g., 40 mils) from the point at which video was detected and to move it to the right margin. The completion of this operation then activates a character-search generator 440 to produce in a conventional manner a scanning-pattern (BD) which moves alternately upwardly and downwardly over a small distance and horizontally to the left. A signal CSM, indicating that the character-search mode is in progress, also resets next-line latch 401. CSM additionally enables AND 423, so that, if the auxiliary boundary is passed, gates 422 and 423 will reactivate line-search generator 420. That is, this condition indicates that the video detected by strike generator 430 was a speck of dirt or ink splatter, rather than a valid character.

On the other hand, the detection of video during the character-search scan energizes a normalizing generator 450 through AND 451. Normalizing generator 450 then scans the detected video to determine its height and width. The details of such a generator may be found in commonly assigned application U.S. Ser. No. 790,616; the particular normalizing pattern employed and the various actions to be taken in case the detected character has an improper size, however, are not important to the present objectives.

An output NSC, indicating the successful completion of the normalizing scan, then energizes an initialization generator 460 to return the beam, via signals BF, to the right margin (RRM) at a vertical coordinate related to that of the normalized character. The completion of the initializing scan causes a signal ISC to start a recognition-scan generator 470. It will be appreciated at this point that, although generator 470 is immediately responsive to the output of generator 460, its ultimate precursor is strike generator 430. A recognition scan may be of any convenient type, such as, for instance, the bar-code scan discussed in commonly assigned application serial number 619,226, filed Feb. 28, 1967. Recognition scanning preferably commences at the right margin, rather than at the horizontal location of the first valid character sensed by generator 450, in order to pick up any small characters which may have been missed in the normalizing process.

The recognition scan continues until signal LLM from margin switch 320 signals that the scanning beam has crossed the left margin. At this time, a conventional line-idle scan generator 480 causes beam control 160 to retain the horizontal position of the line just read by performing a holding pattern thereon. This pattern is one which continuously rescans a portion of the line just read in order to provide a starting point for a subsequent line-search scan. Such a holding scan is necessary since stopping the scanning beam for even a few microseconds in one location would burn a hole in the phosphor of CRT 101; additionally, even if the beam could be blanked during this interval, unavoidable low-frequency drift would rapidly degrade the accuracy of the beam location. The left-margin signal LLM also indicates the end of a character line to CPU channel 130. The channel may then respond in one of two ways. If, for some reason, the character line previously read must be reread, a READ command alone is transmitted to scan-selection unit 400. Since next-line latch 401 has not been set, the READ command is routed through AND 403 by reset signal SL. AND 403 then energizes initialization generator 460 through OR 461, and the initializing and bar-code scan proceed as previously described.

In the normal course of events, however, it will be desired to search for further character lines after the scanning of one line has been completed. This result is accomplished by issuing a truncated LOAD command (i.e., one not accompanied by a new format word) from CPU 130 to set latch 401, and by issuing a subsequent READ command. This latter sequence of commands will then energize line-search generator 420 through AND 421, as previously described. The line-search scan will then proceed downwardly from the position held by the line-idle scan generator 480.

If, during any line-search scan, whether or not any character line has been found within the field, the scanning beam passes below the third vertical boundary, the BV3 signal from position-detection unit 200 will activate margin latch 310 (FIG. 3) to terminate the document field by producing the TERM signal, as previously described. This signal, in addition to informing channel 130 that the end of the field has been reached, also energizes an aging-scan generator 490. An aging scan, more fully explained in commonly assigned application U.S. Ser. No. 672,550, is a large-area scan which avoids the preferential aging of certain parts of the CRT phosphor. The aging scan then continues until seek generator 410 is again energized after the loading of a subsequent format word FRMT.

In view of the above description of a preferred embodiment it may now be appreciated that the present scan-control apparatus 150 is capable of reading printed characters whose location on a document need not be exactly specified. This is accomplished by causing a format word to specify the complete outline of a document field in which characters may appear, and by providing sequential scanning patterns to find and read these characters. Furthermore, these fields need not be rectangular in shape. The fields shown in FIG. 5 are generally L-shaped, since this configuration is commonly found in business and commercial documents such as sales slips and the like. More complicated shapes, however, may be easily implemented by simple reduplication of the subunits of position-detection unit 200, and by extension of the structure of latch 310 and margin switches 320—340. Moreover, although the reading direction herein specified is from right to left for convenience in reading numerical information, a modification of the disclosed apparatus to read in an opposite direction may easily be implemented.

It is also possible, of course, to adapt the basic area-format concepts disclosed herein to the scanning of images other than characters, such as object outlines, fingerprints and nuclearparticle tracks, to name but a few. Many other capabilities, advantages, applications and modifications of the present scan-control apparatus will be apparent to those skilled in the scanning arts.

Having thus described a preferred embodiment thereof, we claim as our invention:

We claim:

1. In a recognition system, a scan-control apparatus responsive to a variable format word from a data processor for causing a beam control to move a scanning beam in a sequence of scans relative to a plurality of boundaries defined by said format word, said apparatus comprising:

a position-detection unit responsive to said format word for producing a plurality of representations of said boundaries;

a margin-control unit responsive to said position-detection unit for producing a plurality of signals indicative of the location of said scanning beam relative to selected ones of said boundaries; and a scan-selection unit responsive to said margin-control unit and to said data processor for producing signals representing said scans and for transmitting selected ones of said signals to said beam control, said scan-selection unit including a seek generator responsive to a first command from said data processor for positioning said beam relative to at least one of said boundaries, a line-search generator responsive to said seek generator for producing a scan for black video, and a strike generator responsive to said line-search generator for positioning said beam relative to said black video.

2. The combination according to claim 1 wherein said representations define a predetermined area having first and second vertical boundaries and having first and second horizontal boundaries.

3. The combination according to claim 2 wherein said position-detection unit includes a plurality of registers each adapted to store a byte of said format word, a plurality of converters responsive to said registers for converting said format-word bytes into corresponding analogue signals, and a plurality of comparators responsive to said converters and to said beam control for comparing the position of said beam to the values of said analogue signals.

4. The combination according to claim 3 wherein said position-detection unit further includes a sequencer responsive to said data processor for producing a plurality of signals indicative of respective ones of said format-word bytes, and gating means responsive to said gating signals for entering said bytes into predetermined ones of said registers.

5. The combination according to claim 3 wherein said position-detection unit further includes a decoder responsive to one of said registers for causing said beam control to alter the directions of said scans.

6. The combination according to claim 2 wherein said margin-control unit includes a first margin switch responsive to at least one of said horizontal-boundary representations for producing a first of said margin-control signals, a second margin switch responsive to at least one other of said horizontal-boundary representations for producing a second of said margin-control signals; means responsive to one of said vertical-boundary representations for producing a field-termination signal, and means for communicating said termination signal to said data processor.

7. The combination according to claim 6 wherein said means responsive to said vertical-boundary representation is further responsive to said line-search generator in producing said termination signal.

8. The combination according to claim 6 wherein said boundary representations further define a third vertical and a third horizontal boundary of said predetermined area.

9. The combination according to claim 8 wherein said margin-control unit further includes means responsive to at least one of said vertical-boundary representations for producing a plurality of subarea signals; and wherein at least one of said margin switches is responsive to said subarea signals and to a plurality of said horizontal-boundary representations in producing its associated margin-control signal.

10. The combination according to claim 9 wherein said position-detection unit includes a decoder responsive to a byte of said format word to produce a plurality of margin-status signals; and wherein at least one of said margin switches is responsive to said status signals in producing its associated margin-control signal.

11. The combination according to claim 2 wherein said scan-selection unit includes a latch having a set state responsive to a second command from said data processor and having a reset state responsive to said strike generator, means responsive to said seek generator and to said set state for activating said line-search generator, and means responsive to said seek generator and to said reset state for producing a recognition scan in said area.

12. The combination according to claim 2 wherein said scan-selection unit includes a generator responsive to said strike generator for producing a character-search scan within said area.

13. The combination according to claim 12 wherein said scan-selection unit includes a generator responsive to said character-search generator for producing a normalizing scan over said black video, and for producing a signal denoting that said black video has a valid height and a valid width.

14. The combination according to claim 13 wherein said scan-selection unit includes an initialization generator responsive to said valid-height and valid-width signal for positioning said beam relative to said black video.

15. The combination according to claim 14 wherein said scan-selection unit includes a generator responsive to said initialization generator for producing a recognition scan over said black video.